(12) United States Patent
Karabinis

(10) Patent No.: US 6,856,787 B2
(45) Date of Patent: Feb. 15, 2005

(54) WIRELESS COMMUNICATIONS SYSTEMS AND METHODS USING SATELLITE-LINKED REMOTE TERMINAL INTERFACE SUBSYSTEMS

(75) Inventor: Peter D. Karabinis, Cary, NC (US)

(73) Assignee: Mobile Satellite Ventures, LP, Reston, VA (US)

( * ) Notice: Subject to any disclaimer, the term of this patent is extended or adjusted under 35 U.S.C. 154(b) by 186 days.

(21) Appl. No.: 10/151,567

(22) Filed: May 20, 2002

(65) Prior Publication Data

US 2003/0153267 A1 Aug. 14, 2003

Related U.S. Application Data

(60) Provisional application No. 60/356,264, filed on Feb. 12, 2002.

(51) Int. Cl.[7] .............................................. H04B 7/185
(52) U.S. Cl. ......................... 455/12.1; 455/427; 455/15
(58) Field of Search .............................. 455/13.1, 12.1, 455/427, 428, 430, 7, 9, 10, 11.1, 15–17, 25, 18–24

(56) References Cited

U.S. PATENT DOCUMENTS

| | | | |
|---|---|---|---|
| 5,907,541 A | 5/1999 | Fairholm et al. ............ 370/316 |
| 5,930,708 A | * 7/1999 | Stewart et al. ............... 455/428 |
| 6,052,558 A | 4/2000 | Cook et al. ................. 455/12.1 |
| 6,052,586 A | 4/2000 | Karabinis ..................... 455/427 |
| 6,198,921 B1 | * 3/2001 | Youssefzadeh et al. ...... 455/428 |
| 6,256,497 B1 | * 7/2001 | Chambers ............... 455/430 X |

FOREIGN PATENT DOCUMENTS

| | | | |
|---|---|---|---|
| EP | 0 506 255 A2 | 9/1992 | ........... H04B/7/195 |
| EP | 0 755 163 A2 | 1/1997 | ............ H04Q/7/24 |
| EP | 0 797 319 A2 | 9/1997 | ........... H04B/7/185 |

OTHER PUBLICATIONS

International Search Report, PCT/US03/04038, May 26, 2003.

* cited by examiner

*Primary Examiner*—Nay Maung
*Assistant Examiner*—Philip J. Sobutka
(74) *Attorney, Agent, or Firm*—ShawPittman LLP

(57) ABSTRACT

A satellite gateway is coupled to a communications network and is operative to communicate with a communications satellite. A terrestrial terminal interface subsystem is operative to communicate with the satellite gateway via the communications satellite using a first radio interface and to communicate with terminals over a geographic area using a second radio interface. The communications network may be a wireless communications network, and the satellite gateway is configured to communicate with a base station controller of the wireless communications network, such that the terrestrial terminal interface subsystem may provide one or more satellite-linked terrestrial base stations.

125 Claims, 7 Drawing Sheets

WIRELESS COMMUNICATIONS SYSTEMS AND METHODS USING SATELLITE-LINKED REMOTE TERMINAL INTERFACE SUBSYSTEMS

CROSS-REFERENCE TO RELATED APPLICATION

The present application claims priority to U.S. Provisional Application Ser. No. 60/356,264 entitled "WIRELESS COMMUNICATIONS SYSTEMS AND METHODS USING SATELLITE-LINKED REMOTE TERMINAL INTERFACE SUBSYSTEMS," filed Feb. 12, 2002, the disclosure of which is incorporated herein by reference in its entirety.

BACKGROUND OF THE INVENTION

The present invention relates to wireless communications apparatus and methods, and more particularly, to wireless communications system and methods using satellite and terrestrial components.

FIG. 1 illustrates a conventional terrestrial wireless communications system 100, and more particularly, a system conforming to the GSM standards. The system 100 includes a mobile switching center (MSC) 110, a base station controller (BSC) 120, and at least one base transceiver station (BTS) 130. The BTS 130 includes radio transceivers that communicate with cellular terminals 50, while the BSC 120 manages radio resources for one or more BTSs and provides a connection between the BTSs and the MSC 110. The MSC 110 typically acts like a telephone switching node, and typically provides additional functions related to registration and mobility management for the cellular terminals 50. The MSC 110 is typically coupled to a public switched telephone network (PSTN) 10, which provides communications links between the cellular terminals 50 served by the wireless system 100 and other terminals (e.g., landline telephones). It will be appreciated that other wireless communications systems may provide similar functionality, but may, for example, use other groupings of functions referred to by different nomenclature.

Cellular satellite communications systems and methods are also widely used to provide wireless communications. Cellular satellite communications systems and methods generally employ at least one space-based component, such as one or more satellites that are configured to wirelessly communicate with a plurality of radiotelephones or other types of cellular terminals. The overall design and operation of cellular satellite communications systems and methods are well known to those having skill in the art, and need not be described further herein.

Hybrids of satellite and terrestrial systems may also be used. For example, as is well known to those having skill in the art, terrestrial networks can enhance cellular satellite communications system availability, efficiency and/or economic viability by terrestrially reusing at least some of the frequency bands that are allocated to cellular satellite communications systems. In particular, it is known that it may be difficult for cellular satellite communications systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. One example of terrestrial reuse of satellite frequencies is described in U.S. Pat. No. 5,937,332 to the present inventor Karabinis entitled Satellite Telecommunications Repeaters and Retransmission Methods.

SUMMARY OF THE INVENTION

According to some embodiments of the present invention, a wireless communications system includes a satellite gateway coupled to a communications network and operative to communicate with a communications satellite. The system further includes a terrestrial terminal interface subsystem operative to communicate with the satellite gateway via the communications satellite using a first radio interface and to communicate with wireless terminals over a geographic area using a second radio interface. For example, in some embodiments, the communications network comprises a wireless communications network, and the satellite gateway is configured to communicate with a base station controller of the wireless communications network, such that the terrestrial terminal interface subsystem may provide one or more satellite-linked terrestrial base stations.

In some embodiments, the terrestrial terminal interface subsystem comprises an interface converter operative to convert between the first and second radio interfaces. The interface converter may be operative to transfer information from a plurality of terrestrial wireless communications channels to a lesser number of satellite communications channels. The interface converter may also be operative to transfer information from a single satellite communication channel to a plurality of terrestrial wireless communications channels.

According to further embodiments of the present invention, the terrestrial terminal interface subsystem includes a satellite radio antenna and a terrestrial radio antenna co-located at a single terrestrial base station. The terrestrial terminal interface subsystem may also comprise a plurality of terrestrial base stations located at respective ones of a plurality of geographically distributed sites and served by a single satellite link.

In yet additional embodiments, the communications satellite is further operative to communicate with wireless terrestrial terminals without use of the terrestrial terminal interface subsystem. In particular, the terrestrial terminal interface subsystem or the satellite or both may communicate with wireless terminals. For example, in some embodiments, the communications satellite is operative to receive information intended for wireless terminals from the satellite gateway and to convey the received information to the wireless terminals without use of the terrestrial terminal interface subsystem, while the terrestrial terminal interface subsystem is operative to receive information from wireless terminals and to convey the received information to the communications network without use of the communications satellite. In this manner, for example, "receive only" terrestrial base stations may be used to provide uplinks from wireless terminals to a communications network, while downlinks are provided directly from the satellite to the wireless terminals. In other embodiments, the communications satellite is operative to receive information from wireless terminals without use of the terrestrial terminal interface subsystem and to convey the received information to the satellite gateway, while the terrestrial terminal interface subsystem is operative to receive information intended for wireless terminals from the communications satellite and to convey the received information to terrestrial terminals. In this manner, for example, "transmit-only" terrestrial base stations may be used to provide downlinks from a communications network to wireless terminals, while uplinks may be provided directly from the wireless terminals to the satellite.

According to some method embodiments of the present invention, communications between a communications network and a plurality of wireless terminals served by a terrestrial base station may be provided by conveying terminal communications between the communications network and the terrestrial base station via a communications satellite. The communication via the satellite can be bidirectional or unidirectional.

The present invention may be embodied in variety of forms, including, but not limited to, wireless communications systems, components of wireless communications systems, combinations of components of wireless communications systems, and wireless communications methods. For example, the present invention may be embodied as earth-based components and combinations thereof configured to interoperate with space-based components, as spaced-based components, and as combinations of earth-based and space-based components.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "cellular terminal" refers to wireless terminals including, but not limited to: radiotelephone terminals ("cell phones") with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. These devices may be capable of wireless voice and/or data communications.

Figure 1:
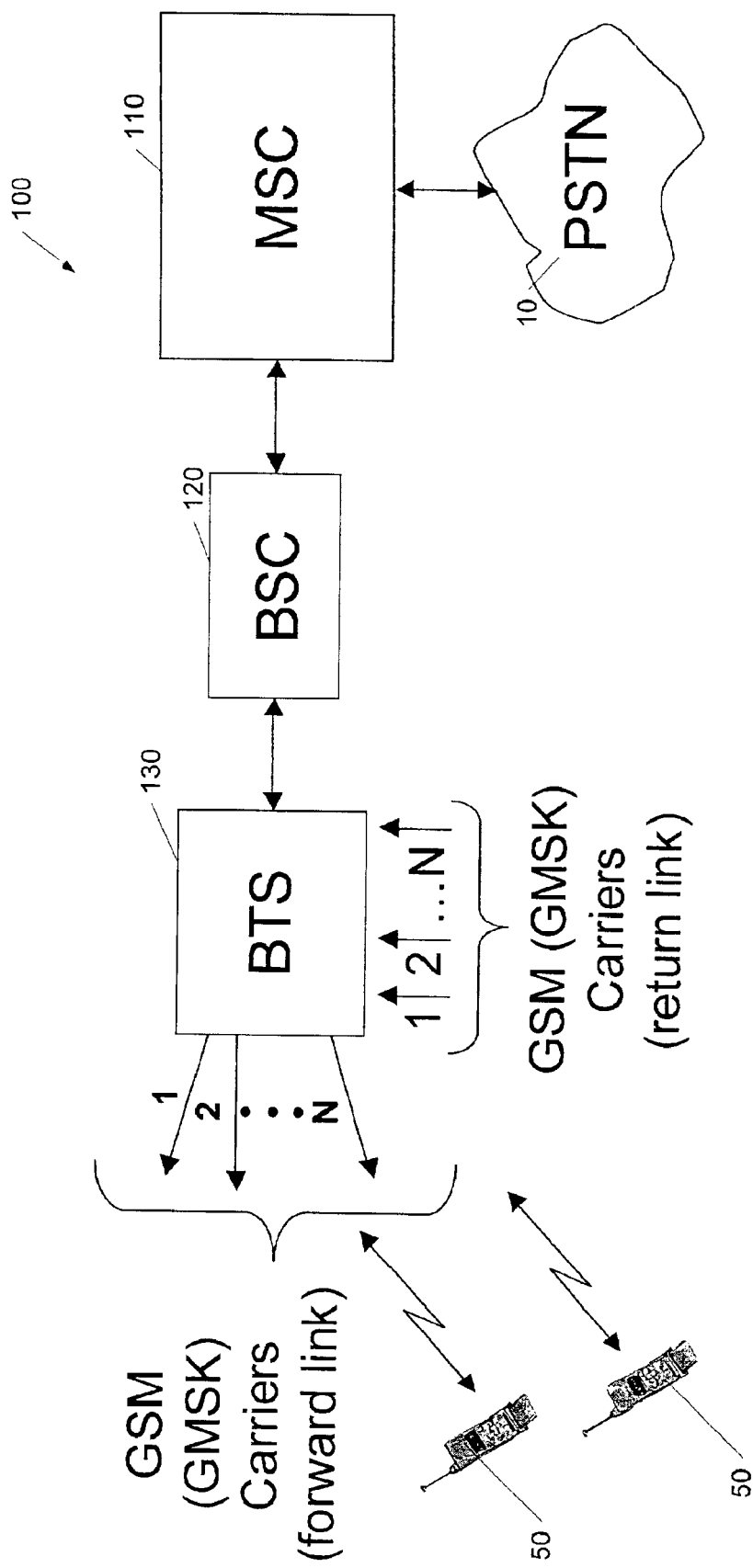
FIG. 1 illustrates a conventional terrestrial wireless communications system.
Figure 2:
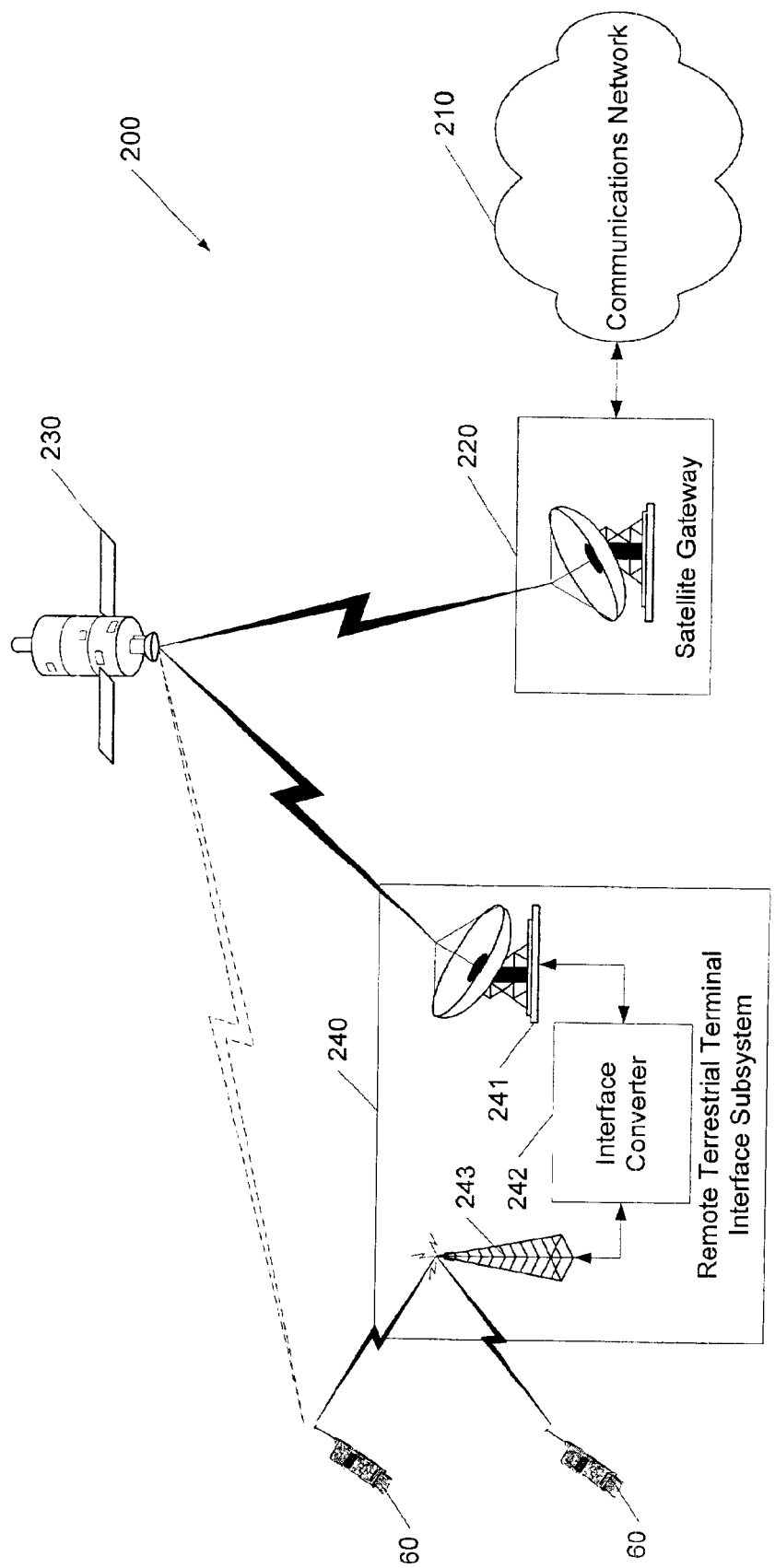
FIG. 2 is a schematic diagram illustrating a wireless communications systems and methods according to some embodiments of the present invention.

FIG. 2 conceptually illustrates a wireless communications system 200 according to embodiments of the present invention. The system 200 includes a satellite gateway 220 that is coupled to a communications network 210 (which may be a portion of the system 200 or an external network), which may include, but is not limited to, wireless network control components, such as BSCs and MSCs, and other gateways similar to the gateway 220. The system 200 further includes one or more remote terrestrial terminal interface subsystems 240 that communicate with the gateway 220 via a satellite 230. In particular, the terrestrial terminal interface subsystem 240 provides communications between cellular terminals 60 served by the terrestrial terminal interface subsystem 240 and the other portions 210 of the communications system 200 via the satellite 230 and the gateway 220.

As shown, the terrestrial terminal interface subsystem 240 includes a satellite antenna 241 and a terrestrial antenna 243 that are connected to an interface converter 242. The interface converter 242 is configured to receive information from cellular terminals 60 according to a first radio interface and to transmit the received information to the satellite 230 according to a second radio interface, and to receive information from the satellite 230 according to the second radio interface and to transmit the received information to the cellular terminals 60 according to the first radio interface. For example, the first radio interface may conform to a conventional standard, such as a GSM standard that uses Gaussian minimum shift keying (GMSK) modulation. The second radio interface may support a higher data rate using, for example, M-ary quadrature amplitude modulation (QAM), such that information received from or intended for cellular terminals 60 may be "concentrated" for transmission over the satellite link. In other embodiments, the first and second radio interfaces may be the same or substantially similar.

It will be appreciated that the interface converter 242 may include a variety of different components. For example, in embodiments described below with reference to FIGS. 3 and 4, the interface converter may be positioned at a remote base station and may include components to convert signals received over the satellite link into radio signals for transmission to cellular terminals, as well as components for performing complementary conversion of signals received from cellular terminals. In embodiments described below with reference to FIG. 5, the interface converter 242 may comprise components distributed among a remote BSC and base stations connected thereto. In such embodiments, the interface converter 242 may include, for example, components configured to convert between the satellite link signaling format and, for example, landline signaling formats used to communicate between the BSC and the base stations, as well as components for converting between the signaling format used for the links between the BSC and the base stations and the radio signaling format used to communicate with cellular terminals.

As also shown in FIG. 2, the remote terrestrial terminal interface subsystem 240 may serve as part of an ancillary terrestrial component of the wireless communications system 200, e.g., may function as a base station of an ancillary terrestrial network (ATN) of a satellite mobile communications system in a manner similar to that of the terrestrial base stations described in a United States Provisional Patent Application entitled "SYSTEMS AND METHODS FOR TERRESTRIAL REUSE OF MOBILE SATELLITE SPECTRUM," U.S. Pat. No. 60/322,240, filed Sep. 14, 2001, and U.S. Patent Application entitled "SYSTEMS AND METHODS FOR TERRESTRIAL RE-USE OF MOBILE SATELLITE SPECTRUM," U.S. Ser. No. 10/074,097, filed Feb. 12, 2002, the disclosure of each of which is incorporated herein by reference in its entirety. In particular, cellular terminals 60 may be operative to communicate with the system 200 directly through the satellite 230, or may indirectly communicate with the system 200 via the remote terrestrial terminal interface subsystem 240. It will be understood, however, that the present invention is also applicable to systems and methods in which communications between cellular terminals 60 and the satellite 230 are limited to communications via terrestrial terminal interface subsystems such as the remote terrestrial terminal interface subsystem 240, i.e., without direct communication between the cellular terminals 60 and the satellite 230.

Figure 3:
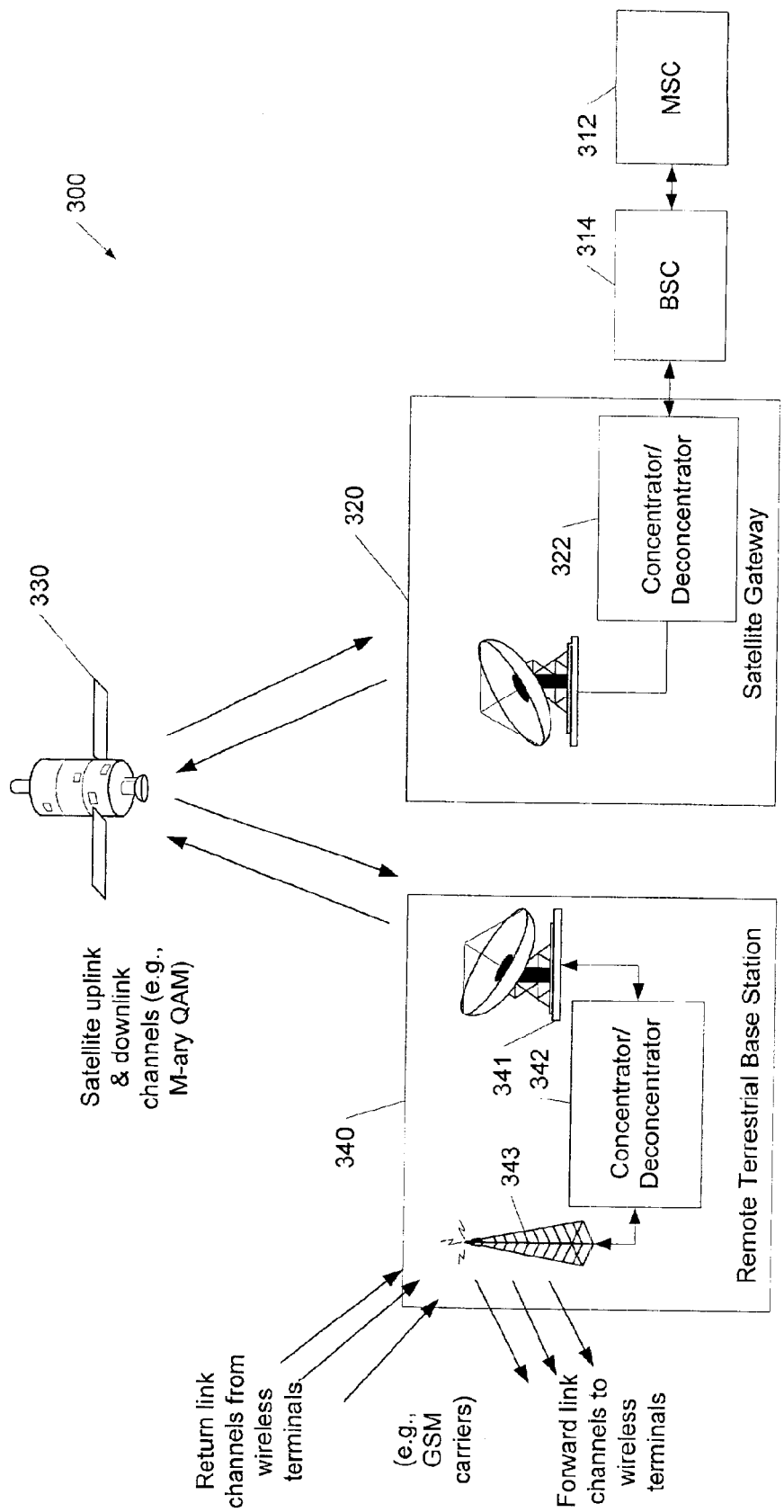
FIG. 3 is a schematic diagram illustrating a wireless communications system and methods according to further embodiments of the present invention.

FIG. 3 illustrates a "repeater" configuration for a wireless communications system 300 according to further embodiments of the present invention. The system 300 includes an MSC 312 and a BSC 314 that communicate with a remote terrestrial terminal interface subsystem, here a remote terrestrial base station 340, via a "repeater" including a gateway 320 and a satellite 330. The remote terrestrial base station 340 includes a first concentrator/deconcentrator 342 that sends and receives signals to and from the satellite 330 via a satellite antenna 341 over, for example, an L-band satellite link using, for example, M-ary quadrature amplitude modulation (QAM). The first concentrator/deconcentrator 342 converts signals received over the satellite link to, for example, GSM-format signals transmitted to cellular terminals via a terrestrial antenna 343 using GMSK modulation, and converts GSM format signals from the cellular terminals to M-ary QAM signals that are transmitted to the satellite 330. The gateway 320 includes a second concentrator/deconcentrator 322 that performs conversion functions complementary to those of the first concentrator/deconcentrator 342.

It will be appreciated that the satellite link through the satellite 330 may generally support a higher data rate than radio links to individual cellular terminals, due to, for example, a less obstructive radio signal propagation environment and/or less interference and/or higher available transmit power. The concentrator/deconcentrator 342, 322 takes advantage of this higher data rate capability by combining information received from or intended for terminals in a signal formatted according to a higher data rate signaling format for transfer through the satellite link.

Figure 4:
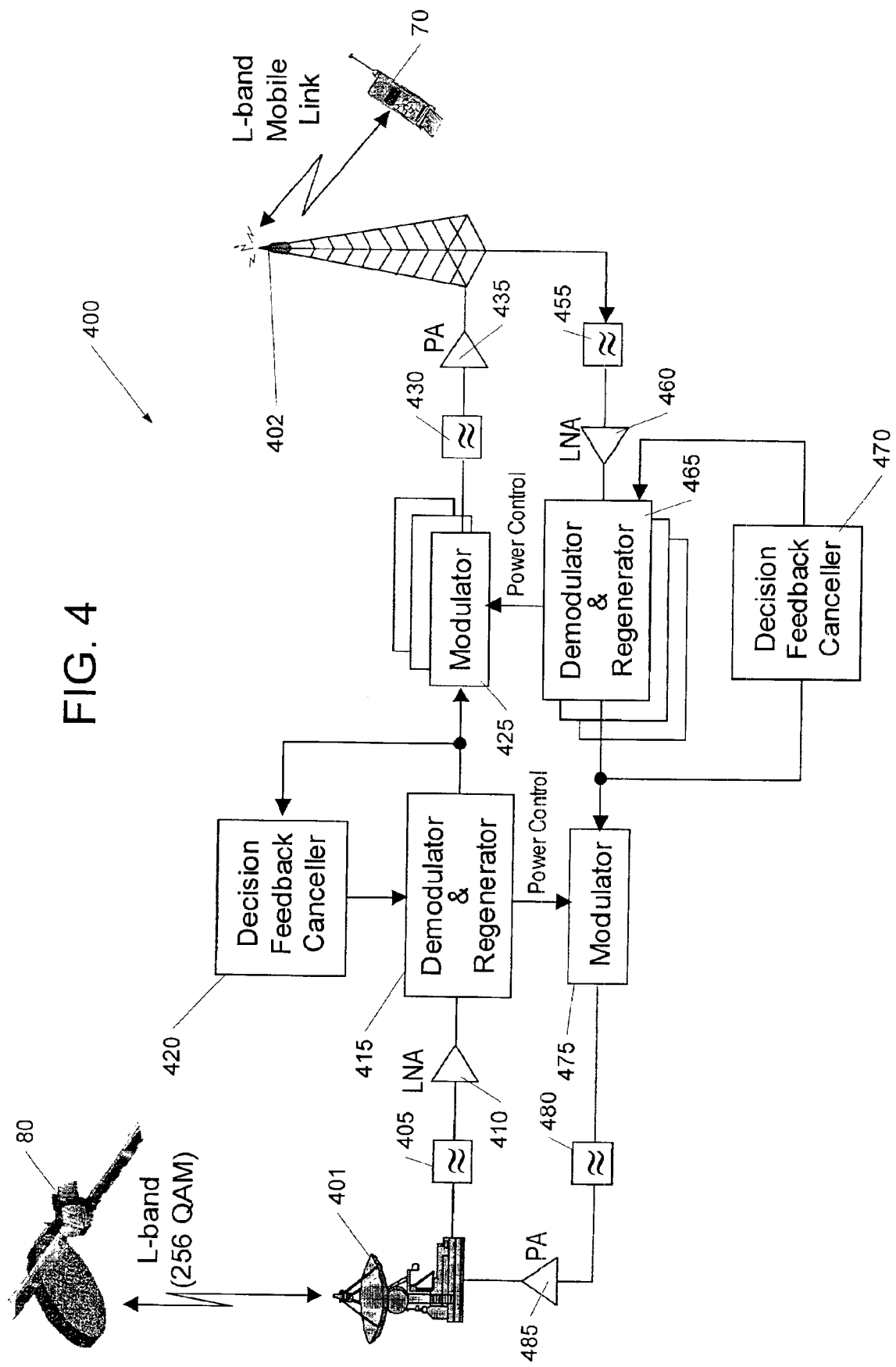
FIG. 4 is a schematic diagram illustrating a terrestrial terminal interface subsystem and methods according to some embodiments of the present invention.

FIG. 4 illustrates a remote terrestrial base station 400 that may be used with a wireless communication system, such as the communications system 300 of FIG. 3, according to further embodiments of the present invention. The base station 400 includes a satellite antenna 401 and a terrestrial antenna 402. Signals received from a satellite 80 via the satellite antenna 401 are processed by a bandpass filter 405 and a low noise amplifier (LNA) 410. The signal produced by the LNA 410 is processed by a demodulator & regenerator component 415 to recover information in a format, e.g., a bitstream or other datastream, suitable for remodulation and transmission to a cellular terminal 70. The demodulator & regenerator component 415 may, for example, produce decoded datastreams that correspond to GSM carriers that are to be transmitted from the terrestrial antenna 402. As shown, the demodulator & regenerator component 415 may be operatively associated with an interference reducer, such as a decision feedback canceller 420, that cancels interference in the signals received by the satellite antenna 401, e.g., interference generated by transmissions from the terrestrial antenna 402. For example, an interference reducer along the lines described in the aforementioned U.S. Ser. No. 60/322,240 and U.S. Ser. No. 10/074,097 may be used.

The information recovered from the demodulator & regenerator component 415 may then be reformatted and remodulated by a modulator component 425. The remodulated signal is then filtered and amplified by a filter 430 and a power amplifier 435 to produce a signal for transmission to the cellular terminal 70 via the terrestrial antenna 402. Power information obtained by the demodulator & regenerator component 415 may be used by a modulator component 475 to control the power of a signal transmitted to the satellite 80.

Signals received from the cellular terminal 70 via the terrestrial antenna 402 are processed by a bandpass filter 455 and an LNA 460. The signal produced by the LNA 460 is processed by a demodulator & regenerator component 465 to recover information in a format suitable for remodulation and transmission to the satellite 80. The demodulator & regenerator component 465 may, for example, produce respective datastreams that correspond to respective GSM carriers received from the terrestrial antenna 402. As shown, the demodulator & regenerator component 465 may be operatively associated with an interference reducer, such as a decision feedback canceller 470, that cancels interference in the signals received by the terrestrial antenna 402, e.g., interference generated by transmissions from the satellite antenna 401. For example, an interference reducer along the lines described in the aforementioned U.S. Ser. No. 60/322,240 and U.S. Ser. No. 10/074,097 may be used.

The information recovered from the demodulator & regenerator component 465 is remodulated in a modulator component 475, producing a remodulated signal corresponding to the multiple GSM carriers. This signal is then filtered and amplified by a filter 480 and a power amplifier 485 to produce a signal for transmission to the satellite 80 via the satellite antenna 401. As described above with reference to FIG. 3, the signal may be conveyed via the satellite 80 to a gateway, which may include a complementary radio interface conversion architecture. Power information obtained by the demodulator & regenerator component 465 may be used by the modulator component 425 to control the power of the signal transmitted to the cellular terminal 70.

Figure 5:
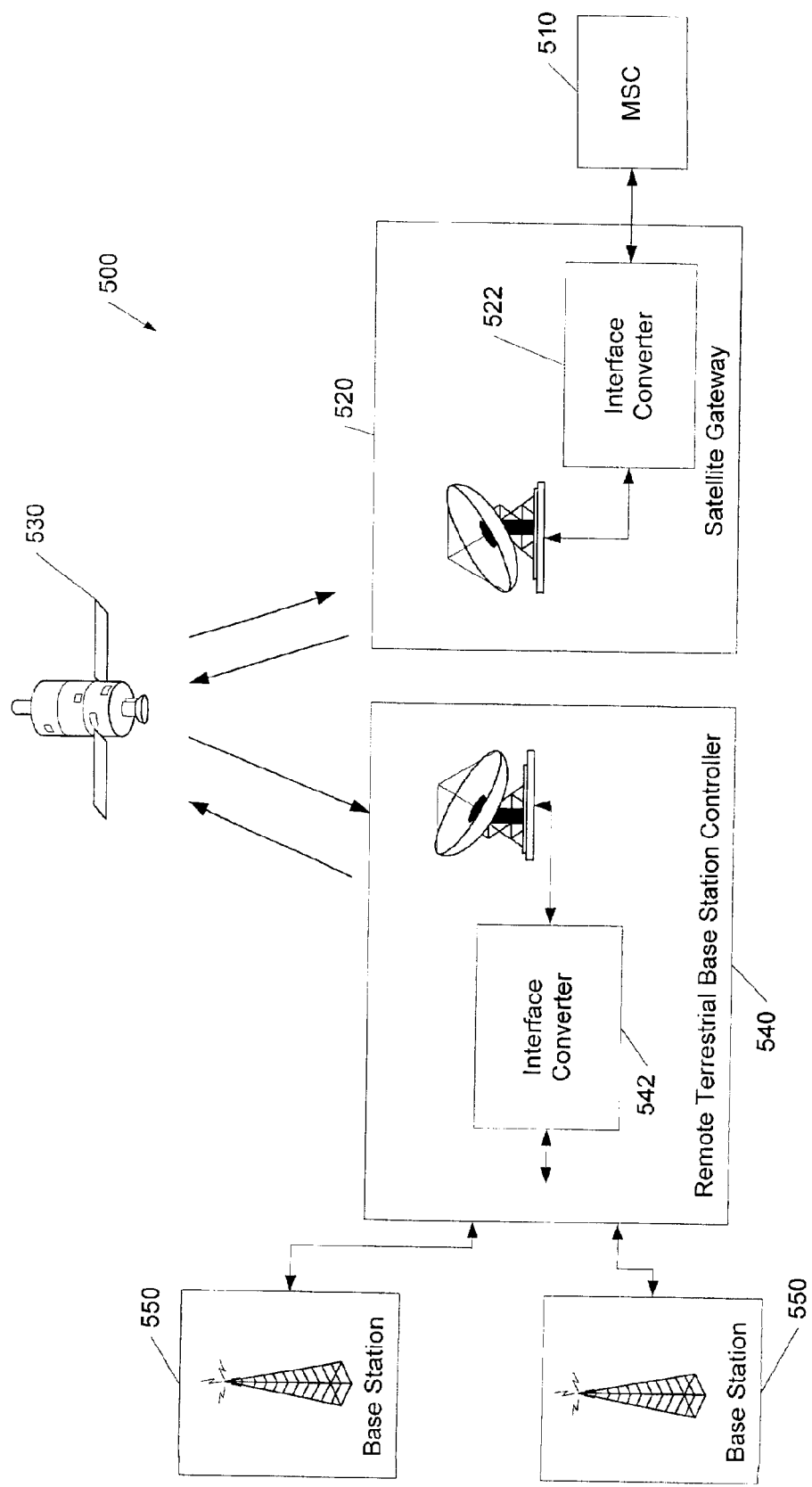
FIG. 5 is a schematic diagram illustrating a wireless communications system and methods according to further embodiments of the present invention.

FIG. 5 illustrates an alternative configuration for a wireless communications and methods system 500 according to further embodiments of the present invention. The system 500 includes an MSC 510 that is linked via a gateway 520 and a satellite 530 to a remote terrestrial terminal interface subsystem, here shown as including a remote terrestrial base station controller 540 connected to base stations 550. The remote BSC 540 is operative to control and communicate cellular terminal information with terrestrial base stations 550. The remote BSC 540 and the gateway 520 include first and second interface converters 542, 522 that provide appropriate conversion between the signaling format(s) used by the MSC 510 and base stations 550 and the signaling format used by the satellite 530. For example, the first and second interface converters 542, 522 may comprise respective concentrator/deconcentrator components.

It will be appreciated that the embodiments of FIGS. 3–5 are provided as examples of possible system and method configurations, and that other configurations also fall within the scope of the invention. In particular, it will be understood that wireless network functionality described above may be distributed in other ways among network components such as satellites, BSCs, MSCs, and base stations.

Figure 6:
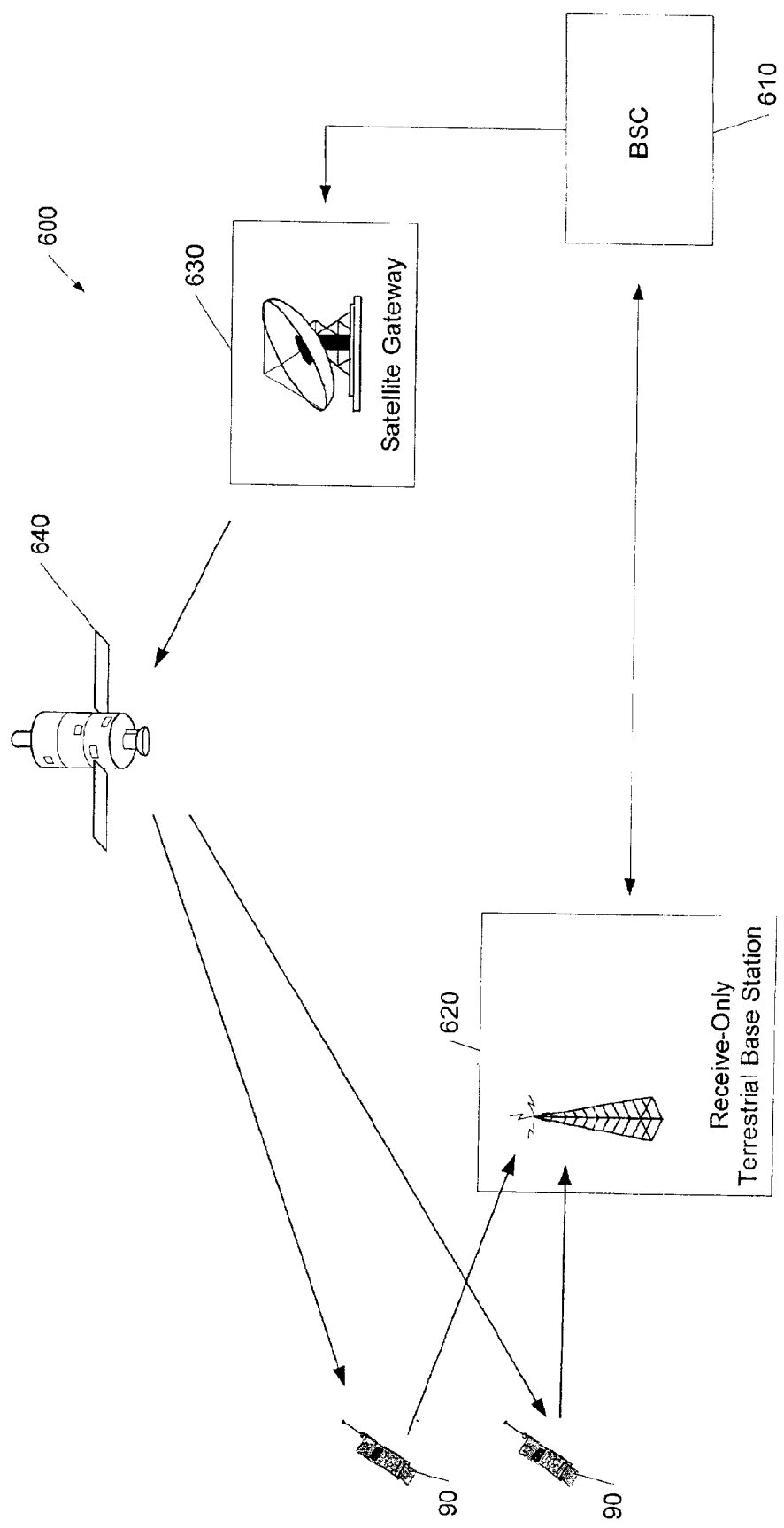
FIG. 6 is a schematic diagram illustrating a wireless communications system and methods according to still further embodiments of the present invention.

FIG. 6 illustrates a wireless communications system 600 and methods according to still further aspects of the present invention. The system 600 includes one or more receive-only terrestrial base stations 620 that receive information from terminals 90 over return service links. Information received by the base station 620 is conveyed to a BSC 610 using, for example, landline and/or radio links (e.g., microwave or satellite links). Forward service links to the terminals 90 are provided via a satellite 640 and a satellite gateway 630 that are linked to the BSC 610. The forward service links and the return service links to and from the terminals 90 may use the same frequency bands and/or signaling protocols (e.g., GSM data format with GMSK modulation), or may use respective different frequency bands and/or signaling protocols. It will be appreciated that embodiments of the present invention may use a structure complementary to that of FIG. 6. For example, transmit-only base stations fed by conventional landlines (e.g., from a BSC) could be used to provide downlinks to terminals, while uplinks from terminals are provided via a communications satellite.

Figure 7:
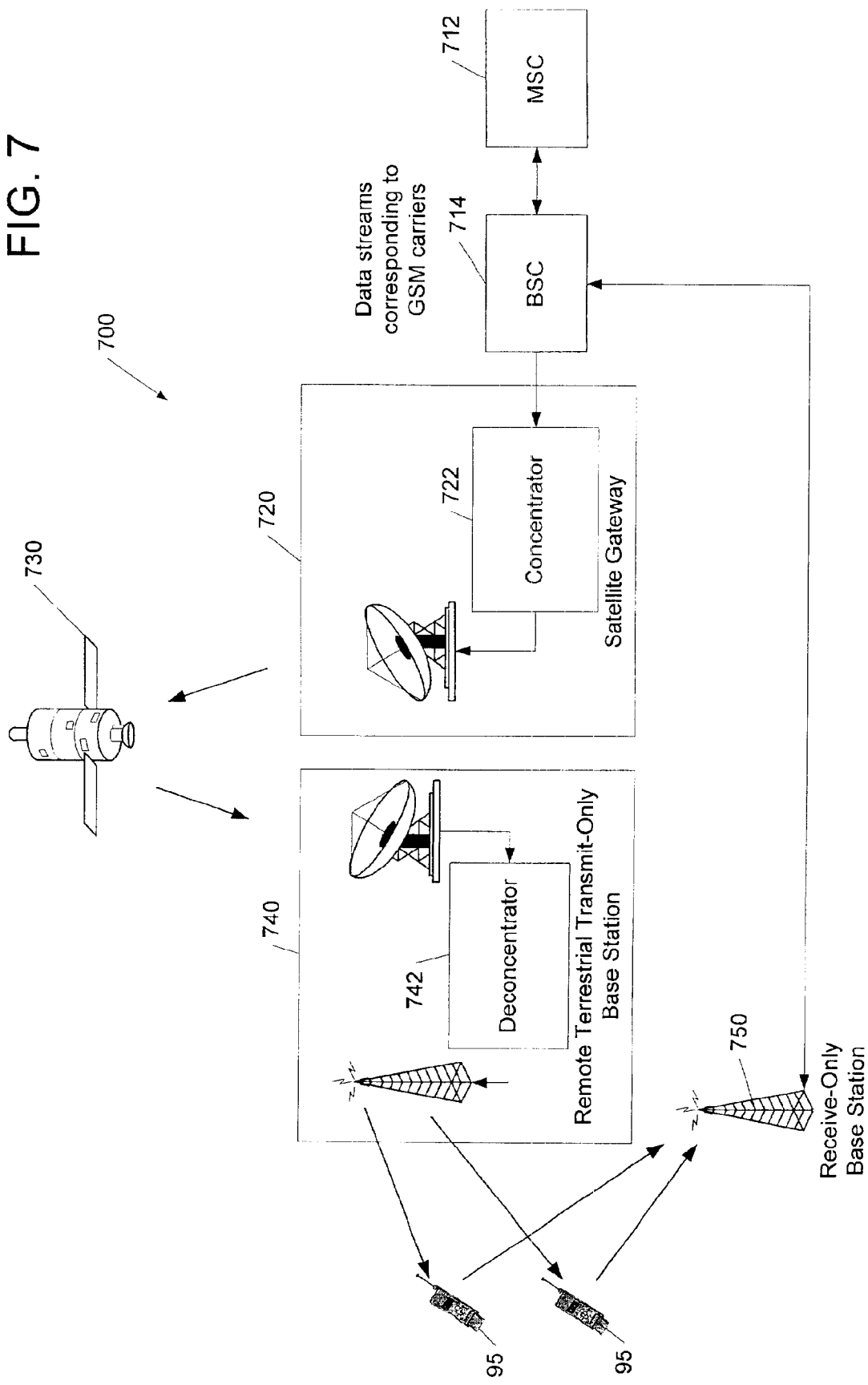
FIG. 7 is a schematic diagram illustrating a wireless communications system and methods according to additional embodiments of the present invention.

FIG. 7 illustrates another "repeater" configuration for a wireless communications system 700 according to further embodiments of the present invention. The system 700 includes an MSC 712 and a BSC 714 that communicates with a remote terrestrial terminal interface subsystem, here including a remote transmit-only terrestrial base station 740, via a repeater including a gateway 720 and a satellite 730. The remote terrestrial transmit-only base station 740 includes a deconcentrator 742 that receives signals from the satellite 730 and converts the signals received over the satellite link to, for example, GSM-format signals transmitted to cellular terminals 95. The gateway 720 includes a concentrator 722 that performs conversion functions complementary to those of the deconcentrator 742. The BSC 714 is also connected to one or more receive-only base stations 750 that receive signals from terminals 95 and convey information therein to the BSC 714 using, for example, conventional cable, fiber or terrestrial microwave links. A combination of the terrestrial transmit-only base station 740 and the receive-only base station 750 may be viewed as forming a satellite-linked terrestrial terminal interface subsystem.

In the drawings and foregoing description thereof, there have been disclosed exemplary embodiments of the invention. Terms employed in the description are used in a generic and descriptive sense and not for purposes of limitation, the scope of the invention being set forth in the following claims.

That which is claimed is:

1. A wireless communications system, comprising:
   a satellite gateway coupled to a communications network and operative to communicate with a mobile communications satellite; and
   a terrestrial terminal interface subsystem operative to communicate with the satellite gateway via the mobile communications satellite using a first radio interface over a first frequency band and to communicate with wireless terminal over a geographic area using a second radio interface over substantially the first frequency band.

2. A system according to claim 1, wherein the first and second radio interfaces are different.

3. A system according to claim 1, wherein the first and second radio interfaces are the same.

4. A system according to claim 1, further comprising the communications satellite.

5. A system according to claim 1, wherein the communications network comprises a wireless communications network, and wherein the satellite gateway is configured to communicate with a base station controller of the wireless communications network.

6. A system according to claim 1, wherein the terrestrial terminal interface subsystem comprises an interface converter operative to convert between the first and second radio interfaces.

7. A system according to claim 6, wherein the interface converter is operative to transfer information from a plurality of terrestrial wireless communications channels to a lesser number of satellite communications channels.

8. A system according to claim 7, wherein the interface converter is operative to transfer information from a single satellite communication channel to a plurality of terrestrial wireless communications channels.

9. A system according to claim 6, wherein the interface converter provides unidirectional communications.

10. A system according to claim 6, wherein the interface converter provides bidirectional communications.

11. A system according to claim 1, wherein the terrestrial terminal interface subsystem includes a satellite radio antenna and a terrestrial radio antenna co-located at a single terrestrial base station.

12. A system according to claim 1, wherein the terrestrial terminal interface subsystem includes a satellite radio antenna and a terrestrial radio antenna located at geographically separate sites.

13. A system according to claim 1, wherein the terrestrial terminal interface subsystem comprises a plurality of terrestrial base stations located at respective ones of a plurality of geographically distributed sites.

14. A system according to claim 1, wherein the communications satellite is further operative to communicate with terrestrial terminals without use of the terrestrial terminal interface subsystem.

15. A system according to claim 1:
   wherein the communications satellite is operative to receive information intended for wireless terminals from the satellite gateway and to convey the received information to the wireless terminals without use of the terrestrial terminal interface subsystem; and
   wherein the terrestrial terminal interface subsystem is operative to receive information from wireless terminals and to convey the received information to the communications network without use of the communications satellite.

16. A system according to claim 1:
   wherein the communications satellite is operative to receive information from wireless terminals without use of the terrestrial terminal interface subsystem and to convey the received information to the satellite gateway; and
   wherein the terrestrial terminal interface subsystem is operative receive information intended for wireless terminals from the communications satellite and to convey the received information to terrestrial terminals.

17. A system according to claim 1,
wherein the terrestrial terminal interface subsystem is operative receive information intended for wireless terminals from the communications satellite and to convey the received information to terrestrial terminals; and
wherein the terrestrial terminal interface subsystem is operative to receive information from wireless terminals and to convey the received information to the communications network without use of the communications satellite.

18. A system according to claim 1, wherein the terrestrial terminal interface subsystem is operative to control transmission power for signals transmitted to the communication satellite to signals received from the communication satellite.

19. A system according to claim 1, wherein the terrestrial terminal interface subsystem is operative to control transmission power for signals transmitted to wireless terminal responsive to signals received from wireless terminals.

20. A system according to claim 1, wherein the terrestrial terminal interface subsystem comprises:
a satellite radio antenna;
a first low-noise amplifier coupled to the satellite radio antenna;
a first demodulation and regeneration unit having an input coupled to an output of the first low noise amplifier;
a first modulator having an input coupled to an output of the first demodulation and regeneration unit;
a first power amplifier having an input coupled to an output of the first modulator; and
a terrestrial radio antenna coupled to the output of the first power amplifier.

21. A system according to claim 20, further comprising a first interference reducer coupled to the first demodulation and regeneration unit.

22. A system according to claim 20, wherein the terrestrial terminal interface subsystem further comprises:
a second low noise amplifier coupled to the terrestrial radio antenna;
a second demodulation and regeneration unit having an input coupled to an output of the second low noise amplifier;
a second modulator having an input coupled to an output of the second demodulation and regeneration unit; and
a second power amplifier having an input coupled to an output of the second modulator and an output coupled to the satellite radio antenna.

23. A system according to claim 22, further comprising a second interference reducer coupled to the second demodulation and regeneration unit.

24. A system according to claim 22, wherein the second modulator is operative to control power of a signal transmitted from the satellite radio antenna responsive to the first demodulation and regeneration unit.

25. A system according to claim 22, wherein the first modulator is operative to control power of a signal transmitted from the terrestrial radio antenna responsive to the second demodulation and regeneration unit.

26. A system according to claim 1, wherein the terrestrial terminal interface subsystem comprises:
a terrestrial radio antenna;
a low noise amplifier coupled to the terrestrial radio antenna;
a demodulation and regeneration unit having an input coupled to an output of the low noise amplifier;
a modulator having an input coupled to an output of the demodulation and regeneration unit;
a power amplifier having an input coupled to an output of the second modulator; and
a satellite radio antenna coupled to an output of the power amplifier.

27. A system according to claim 1 further comprising a wireless terminal.

28. The system according to claim 1, wherein the frequency band is the L band.

29. A terrestrial terminal interface subsystem for a wireless communications system, the subsystem comprising:
a satellite radio antenna;
a terrestrial radio antenna; and
an interface converter operative to communicate with a mobile communications satellite via the satellite radio antenna using a first radio interface over a first frequency band and to communicate with wireless terminals over a geographic area via the terrestrial radio antenna using a second radio interface over substantially the same first frequency band.

30. A subsystem according to claim 29, wherein the interface converter is operative to transfer information from a plurality of terrestrial wireless communications channels to a lesser number of satellite communications channels.

31. A subsystem according to claim 29, wherein the interface converter is operative to transfer information from a single satellite communication channel to a plurality of terrestrial wireless communications channels.

32. A subsystem according to claim 29, wherein the terrestrial radio antenna, the satellite radio antenna, and the interface converter are co-located at a single terrestrial base station.

33. A subsystem according to claim 29, wherein the terrestrial radio antenna and the satellite radio antenna are positioned at geographically separate locations.

34. A subsystem according to claim 29, wherein the terrestrial radio antenna comprises a plurality of terrestrial radio antennas located at respective ones of a plurality of second geographically distributed second terrestrial sites.

35. A subsystem according to claim 29, wherein the interface converter provides unidirectional communications.

36. A subsystem according to claim 29, wherein the interface converter provides bidirectional communications.

37. A subsystem according to claim 29, comprising:
a first low-noise amplifier coupled to the satellite radio antenna;
a first demodulation and regeneration unit having an input coupled to an output of the first low noise amplifier;
a first modulator having an input coupled to an output of the first demodulation and regeneration unit;
a first power amplifier having an input coupled to an output of the first modulator and an output coupled to the terrestrial radio antenna.

38. A subsystem according to claim 37, further comprising a first interference reducer coupled to the first demodulation and regeneration unit.

39. A subsystem according to claim 37, comprising:
a second low noise amplifier coupled to the terrestrial radio antenna;
a second demodulation and regeneration unit having an input coupled to an output of the second low noise amplifier;
a second modulator having an input coupled to an output of the second demodulation and regeneration unit; and a second power amplifier having an input coupled to an output of the second modulator and an output coupled to the satellite radio antenna.

40. A subsystem according to claim 39, further comprising a second interference reducer coupled to the second demodulation and regeneration unit.

41. A subsystem according to claim 39, wherein the second modulator is operative to control power of a signal transmitted from the satellite radio antenna responsive to the first demodulation and regeneration unit.

42. A subsystem according to claim 37, wherein the first modulator is operative to control power of a signal transmitted from the terrestrial radio antenna responsive to the second demodulation and regeneration unit.

43. A subsystem according to claim 29, wherein the terrestrial terminal interface subsystem further comprises:
 a lownoise amplifier coupled to the terrestrial radio antenna;
 a demodulation and regeneration unit having an input coupled to an output of the low noise amplifier;
 a modulator having an input coupled to an output of the demodulation and regeneration unit; and
 a power amplifier having an input coupled to an output of the second modulator and an output coupled to the satellite radio antenna.

44. An apparatus, comprising:
 a satellite gateway operative to communicate with a communications network and to communicate via a mobile communications satellite with a terrestrial terminal interface system that serves wireless terminals in a geographic area, wherein communication between the terrestrial terminal interface and the mobile communications satellite, and communication between the terrestrial terminal interface and wireless terminals occurs over substantially the same frequency band.

45. An apparatus according to claim 44, wherein the communications network comprises a wireless communications network, and wherein the satellite gateway is configured to communicate with a base station controller of the wireless communications network.

46. An apparatus, comprising:
 a mobile communications satellite operative to convey terminal communications between an earth-based communications network and a terrestrial wireless base station that communicates with wireless terminals in a geographic area, wherein communication between the terrestrial wireless base station and the mobile communications satellite, and communication between the wireless base station and the wireless terminals occurs over substantially the same frequency band.

47. An apparatus according to claim 46, wherein the communications satellite is further operative to communicate with wireless terminals without use of the terrestrial wireless base station.

48. A method of providing communications between a communications network and a plurality of wireless terminals served by a terrestrial base station, the method comprising: conveying terminal communications between the communications network and the terrestrial base station via a mobile communications satellite, wherein communication between the terrestrial base station and the mobile communications satellite, and communication between the terrestrial base station and wireless terminals served by the terrestrial base station occurs over substantially the same frequency band.

49. A method according to claim 48, wherein conveying terminal communications between the communications network and the terrestrial base station via a communications satellite comprises:
 conveying a first radio signal from the communications satellite to earth using a first radio interface; and
 conveying a second radio signal from the first radio signal from the terrestrial base station to a wireless terminal using a second radio interface, the second radio signal including information from the first radio signal.

50. A method according to claim 49, wherein the first and second radio interfaces are the same.

51. A method according to claim 48, wherein conveying terminal communications between the communications network and the terrestrial base station via a communications satellite comprises:
 conveying a first radio signal from a wireless terminal to the terrestrial base station using a first radio interface; and
 conveying a second radio signal from earth to the communications satellite using a second radio interface, the second radio signal including information from the first radio signal.

52. A method according to claim 51, wherein the first and second radio interfaces are the same.

53. A method according to claim 48, wherein conveying terminal communications between the communications network and the terrestrial base station via a communications satellite comprises conveying the terminal communications via a satellite antenna co-located with the terrestrial base station.

54. A method according to claim 48, wherein conveying terminal communications between the communications network and the terrestrial base station via a communications satellite comprises conveying terminal communications between the communications network and a plurality of terrestrial base stations via a single satellite link.

55. A method according to claim 48, wherein the communications network comprises a wireless communications network, and wherein conveying terminal communications between the communications network and the terrestrial base station via a communications satellite comprises conveying the terminal communications between the communications satellite and a satellite gateway coupled to a base station controller of the wireless communications network.

56. A method according to claim 48, wherein conveying terminal communications between the communications network and the terrestrial base station via a communications satellite comprises transferring information from a plurality of terrestrial wireless communications channels to a lesser number of satellite communications channels.

57. A method according to claim 48, wherein conveying terminal communications between the communications network and the terrestrial base station via a communications satellite comprises transferring information from a single satellite communication channel to a plurality of terrestrial wireless communications channels.

58. A method according to claim 48, further comprising communicating between the communications satellite and wireless terminals without use of a terrestrial base station.

59. A method according to claim 48:
 wherein conveying terminal communications between the communications network and the terrestrial base station via a communications satellite comprises conveying terminal communications from the terrestrial base station to the communications satellite; and
 wherein the method further comprises conveying terminal communications from the communications satellite to wireless terminals without use of a terrestrial base station.

60. A method according to claim 48:
wherein conveying terminal communications between the communications network and the terrestrial base station via a communications satellite comprises conveying terminal communications from the communications satellite to the terrestrial base station; and
wherein the method further comprises conveying terminal communications from wireless terminals to the communications satellite without use of a terrestrial base station.

61. A method according to claim 48, further comprising controlling transmission power for signals transmitted to the communications satellite responsive to signals received from the communications satellite.

62. A method according to claim 48, further comprising controlling transmission power for signals transmitted to wireless terminals responsive to signals received from wireless terminals.

63. A method according to claim 48, wherein conveying terminal communications between the communications network and the terrestrial base station via a communications satellite comprises:
receiving a signal from the communications satellite at an earth-based satellite radio antenna;
low-noise amplifying the received signal;
demodulating the amplified signal and generating a signal from the demodulated signal in a format suitable for transmission to a wireless terminal;
modulating the demodulated and regenerated signal;
amplifying the modulated signal; and
transmitting the amplified signal from a terrestrial radio antenna to a wireless terminal.

64. A method according to claim 48, wherein conveying terminal communications between the communications network and the terrestrial base station via a communications satellite comprises:
receiving a radio signal from a wireless terminal at the terrestrial radio antenna;
low noise amplifying the received radio signal;
demodulating the amplified radio signal and generating a signal from the demodulated signal in a format suitable for transmission to the communications satellite;
modulating the generated signal;
amplifying the modulated signal; and
transmitting the amplified signal from an earth-based satellite radio antenna.

65. An apparatus for providing communications between a communications network and a plurality of wireless terminals served by a terrestrial base station, the apparatus comprising:
means for conveying terminal communications between the communications network and the terrestrial base station via a mobile communications satellite using a first radio interface; and
means for conveying the terminal communications between the terrestrial base station and wireless terminals using a second radio interface, wherein at least part of the terminal communications occurs over substantially the same frequency band.

66. An apparatus according to claim 65, wherein the means for conveying terminal communications between the communications network and the terrestrial base station via a communications satellite using a first radio interface comprises means for conveying terminal communications between the communications network and a plurality of terrestrial base stations via a single satellite link.

67. An apparatus according to claim 66, wherein the means for conveying terminal communications between the communications network and the terrestrial base station via a communications satellite using a first radio interface comprises means for transferring information from a plurality of terrestrial wireless communications channels to a lesser number of satellite communications channels.

68. An apparatus according to claim 65, wherein the means for conveying terminal communications between the communications network and the terrestrial base station via a communications satellite using a first radio interface comprises means for transferring information from a single satellite communication channel to a plurality of terrestrial wireless communications channels.

69. An apparatus according to claim 65, further comprising means for communicating between the communications satellite and wireless terminals without use of a terrestrial base station.

70. A wireless communications system, comprising:
a satellite gateway coupled to a communications network and operative to communicate with a communications satellite; and
a terrestrial terminal interface subsystem operative to communicate with the satellite gateway via the communications satellite using a first radio interface and to communicate with wireless terminals over a geographic area using a second radio interface,
wherein the communications satellite is operative to receive information intended for wireless terminals from the satellite gateway and to convey the received information to the wireless terminals without use of the terrestrial terminal interface subsystem; and
wherein the terrestrial terminal interface subsystem is operative to receive information from wireless terminals and to convey the received information to the communications network without use of the communications satellite.

71. A system according to claim 70, wherein the first and second radio interfaces are different.

72. A system according to claim 70, wherein the first and second radio interfaces are the same.

73. A system according to claim 70, further comprising the communications satellite.

74. A system according to claim 70, wherein the communications network comprises a wireless communications network, and wherein the satellite gateway is configured to communicate with a base station controller of the wireless communications network.

75. A system according to claim 70, wherein the terrestrial terminal interface subsystem comprises an interface converter operative to convert between the first and second radio interfaces.

76. A system according to claim 75, wherein the interface converter is operative to transfer information from a plurality of terrestrial wireless communications channels to a lesser number of satellite communications channels.

77. A system according to claim 75, wherein the interface converter is operative to transfer information from a single satellite communication channel to a plurality of terrestrial wireless communications channels.

78. A system according to claim 75, wherein the interface converter provides unidirectional communications.

79. A system according to claim 75, wherein the interface converter provides bidirectional communications.

80. A system according to claim 70, wherein the terrestrial terminal interface subsystem includes a satellite radio antenna and a terrestrial radio antenna co-located at a single terrestrial base station.

81. A system according to claim 70, wherein the terrestrial terminal interface subsystem includes a satellite radio antenna and a terrestrial radio antenna located at geographically separate sites.

82. A system according to claim 70, wherein the terrestrial terminal interface subsystem comprises a plurality of terrestrial base stations located at respective ones of a plurality of geographically distributed sites.

83. A system according to claim 70, wherein the communications satellite is further operative to communicate with terrestrial terminals without use of the terrestrial terminal interface subsystem.

84. A system according to claim 70:
wherein the communications satellite is operative to receive information from wireless terminals without use of the terrestrial terminal interface subsystem and to convey the received information to the satellite gateway; and
wherein the terrestrial terminal interface subsystem is operative receive information intended for wireless terminals from the communications satellite and to convey the received information to terrestrial terminals.

85. A system according to claim 70,
wherein the terrestrial terminal interface subsystem is operative to receive information intended for wireless terminals from the communications satellite and to convey the received information to terrestrial terminals; and
wherein the terrestrial terminal interface subsystem is operative to receive information from wireless terminals and to convey the received information to the communications network without use of the communications satellite.

86. A system according to claim 70, wherein the terrestrial terminal interface subsystem is operative to control transmission power for signals transmitted to the communications satellite responsive to signals received from the communications satellite.

87. A system according to claim 70, wherein the terrestrial terminal interface subsystem is operative to control transmission power for signals transmitted to wireless terminals responsive to signals received from wireless terminals.

88. A system according to claim 70, wherein the terrestrial terminal interface subsystem comprises:
a satellite radio antenna;
first low-noise amplifier coupled to the satellite radio antenna;
a first demodulation and regeneration unit having an input coupled to an output of the first low noise amplifier;
a first modulator having an input coupled to an output of the first demodulation and regeneration unit;
a first power amplifier having an input coupled to an output of the first modulator; and
a terrestrial radio antenna coupled to the output of the first power amplifier.

89. A system according to claim 88, further comprising a first interference reducer coupled to the first demodulation and regeneration unit.

90. A system according to claim 88, wherein the terrestrial terminal interface subsystem further comprises:
a second low noise amplifier coupled to the terrestrial radio antenna;
a second demodulation and regeneration unit having an input coupled to an output of the second low noise amplifier;
a second modulator having an input coupled to an output of the second demodulation and regeneration unit; and
a second power amplifier having an input coupled to an output of the second modulator and an output coupled to the satellite radio antenna.

91. A system according to claim 90, further comprising a second interference reducer coupled to the second demodulation and regeneration unit.

92. A system according to claim 90, wherein the second modulator is operative to control power of a signal transmitted from the satellite radio antenna responsive to the first demodulation and regeneration unit.

93. A system according to claim 90, wherein the first modulator is operative to control power of a signal transmitted from the terrestrial radio antenna responsive to the second demodulation and regeneration unit.

94. A system according to claim 70, wherein the terrestrial terminal interface subsystem comprises:
a terrestrial radio antenna;
a low noise amplifier coupled to the terrestrial radio antenna;
a demodulation and regeneration unit having an input coupled to an output of the low noise amplifier;
a modulator having an input coupled to an output of the demodulation and regeneration unit;
a power amplifier having an input coupled to an output of the modulator; and
a satellite radio antenna coupled to an output of the power amplifier.

95. A system according to claim 70, further comprising a wireless terminal.

96. A terrestrial terminal interface subsystem for a wireless communications system, the subsystem comprising:
a satellite radio antenna;
a terrestrial radio antenna;
an interface converter operative to communicate with a communications satellite via the satellite radio antenna using a first radio interface and to communicate with wireless terminals over a geographic area via the terrestrial radio antenna using a second radio interface;
a first low-noise amplifier coupled to the satellite radio antenna;
a first demodulation and regeneration unit having an input coupled to an output of the first low noise amplifier;
a first modulator having an input coupled to an output of the first demodulation and regeneration unit; and
a first power amplifier having an input coupled to an output of the first modulator and an output coupled to the terrestrial radio antenna.

97. A subsystem according to claim 96, wherein the interface converter is operative to transfer information from a plurality of terrestrial wireless communications channels to a lesser number of satellite communications channels.

98. A subsystem according to claim 96, wherein the interface converter is operative to transfer information from a single satellite communication channel to a plurality of terrestrial wireless communications channels.

99. A subsystem according to claim 96, wherein the terrestrial radio antenna, the satellite radio antenna, and the interface converter are co-located at a single terrestrial base station.

100. A subsystem according to claim 96, wherein the terrestrial radio antenna and the satellite radio antenna are positioned at geographically separate locations.

101. A subsystem according to claim 96, wherein the terrestrial radio antenna comprises a plurality of terrestrial radio antennas located at respective ones of a plurality of second geographically distributed second terrestrial sites.

102. A subsystem according to claim 96, wherein the interface converter provides unidirectional communications.

103. A subsystem according to claim 96, wherein the interface converter provides bidirectional communications.

104. A subsystem according to claim 96, further comprising a first interference reducer coupled to the first demodulation and regeneration unit.

105. A subsystem according to claim 96, comprising:
   a second low noise amplifier coupled to the terrestrial radio antenna;
   a second demodulation and regeneration unit having an input coupled to an output of the second low noise amplifier;
   a second modulator having an input coupled to an output of the second demodulation and regeneration unit; and
   a second power amplifier having an input coupled to an output of the second modulator and an output coupled to the satellite radio antenna.

106. A subsystem according to claim 105, further comprising a second interference reducer coupled to the second demodulation and regeneration unit.

107. A subsystem according to claim 105, wherein the second modulator is operative to control power of a signal transmitted from the satellite radio antenna responsive to the first demodulation and regeneration unit.

108. A subsystem according to claim 99, wherein the first modulator is operative to control power of a signal transmitted from the terrestrial radio antenna responsive to the second demodulation and regeneration unit.

109. A subsystem according to claim 96, wherein the terrestrial terminal interface subsystem further comprises:
   a low noise amplifier coupled to the terrestrial radio antenna;
   a demodulation and regeneration unit having an input coupled to an output of the low noise amplifier;
   a modulator having an input coupled to an output of the demodulation and regeneration unit; and
   a power amplifier having an input coupled to an output of the second modulator and an output coupled to the satellite radio antenna.

110. A method of providing communications between a communications network and a plurality of wireless terminals served by a terrestrial base station, the method comprising:
   conveying terminal communications between the communications network and the terrestrial base station via a communications satellite,
   wherein conveying terminal communications between the communications network and the terrestrial base station via a communications satellite comprises:
   receiving a signal from the communications satellite at an earth-based satellite radio antenna;
   low-noise amplifying the received signal;
   demodulating the amplified signal and generating a signal from the demodulated signal in a format suitable for transmission to a wireless terminal;
   modulating the demodulated and regenerated signal;
   amplifying the modulated signal; and
   transmitting the amplified signal from a terrestrial radio antenna to a wireless terminal.

111. A method according to claim 110, wherein conveying terminal communications between the communications network and the terrestrial base station via a communications satellite comprises:
   conveying a first radio signal from the communications satellite to earth using a first radio interface; and
   conveying a second radio signal from the first radio signal from the terrestrial base station to a wireless terminal using a second radio interface, the second radio signal including information from the first radio signal.

112. A method according to claim 111, wherein the first and second radio interfaces are the same.

113. A method according to claim 110, wherein conveying terminal communications between the communications network and the terrestrial base station via a communications satellite comprises:
   conveying a first radio signal from a wireless terminal to the terrestrial base station using a first radio interface; and
   conveying a second radio signal from earth to the communications satellite using a second radio interface, the second radio signal including information from the first radio signal.

114. A method according to claim 113, wherein the first and second radio interfaces are the same.

115. A method according to claim 110, wherein conveying terminal communications between the communications network and the terrestrial base station via a communications satellite comprises conveying the terminal communications via a satellite antenna co-located with the terrestrial base station.

116. A method according to claim 110, wherein conveying terminal communications between the communications network and the terrestrial base station via a communications satellite comprises conveying terminal communications between the communications network and a plurality of terrestrial base stations via a single satellite link.

117. A method according to claim 110, wherein the communications network comprises a wireless communications network, and wherein conveying terminal communications between the communications network and the terrestrial base station via a communications satellite comprises conveying the terminal communications between the communications satellite and a satellite gateway coupled to a base station controller of the wireless communications network.

118. A method according to claim 110, wherein conveying terminal communications between the communications network and the terrestrial base station via a communications satellite comprises transferring information from a plurality of terrestrial wireless communications channels to a lesser number of satellite communications channels.

119. A method according to claim 110, wherein conveying terminal communications between the communications network and the terrestrial base station via a communications satellite comprises transferring information from a single satellite communication channel to a plurality of terrestrial wireless communications channels.

120. A method according to claim 110, further comprising communicating between the communications satellite and wireless terminals without use of a terrestrial base station.

121. A method according to claim 110:
   wherein conveying terminal communications between the communications network and the terrestrial base station via a communications satellite comprises conveying terminal communications from the terrestrial base station to the communications satellite;and
   wherein the method further comprises conveying terminal communications from the communications satellite to wireless terminals without use of a terrestrial base station.

122. A method according to claim 110:
wherein conveying terminal communications between the communications network and the terrestrial base station via a communications satellite comprises conveying terminal communications from the communications satellite to the terrestrial base station; and wherein the method further comprises conveying terminal communications from wireless terminals to the communications satellite without use of a terrestrial base station.

123. A method according to claim 110, further comprising controlling transmission power for signals transmitted to the communications satellite responsive to signals received from the communications satellite.

124. A method according to claim 110, further comprising controlling transmission power for signals transmitted to wireless terminals responsive to signals received from wireless terminals.

125. A method according to claim 110, wherein conveying terminal communications between the communications network and the terrestrial base station via a communications satellite comprises:

receiving a radio signal from a wireless terminal at the terrestrial radio antenna;

low noise amplifying the received radio signal;

demodulating the amplified radio signal and generating a signal from the demodulated signal in a format suitable for transmission to the communications satellite;

modulating the generated signal;

amplifying the modulated signal; and transmitting the amplified signal from an earth-based satellite radio antenna.

* * * * *